(No Model.)
H. GEISE.
NUT LOCK.
No. 601,249. Patented Mar. 29, 1898.
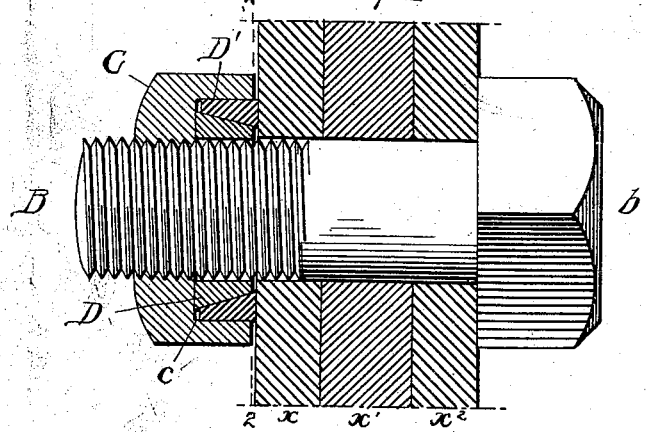
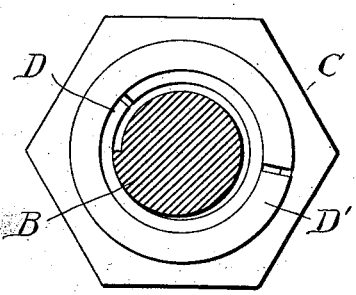
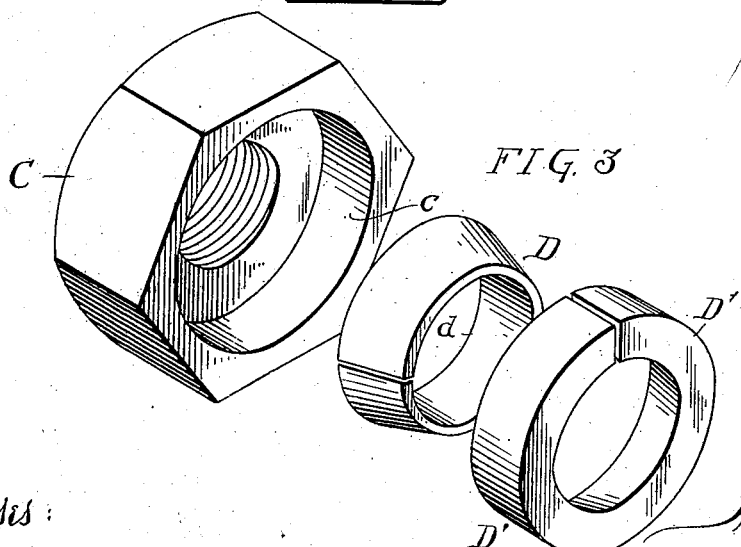
Witnesses:
Inventor:
Henry Geise,
by his Attorney,

UNITED STATES PATENT OFFICE.

HENRY GEISE, OF PHILADELPHIA, PENNSYLVANIA.

NUT-LOCK.

SPECIFICATION forming part of Letters Patent No. 601,249, dated March 29, 1898.

Application filed January 4, 1898. Serial No. 665,536. (No model.)

*To all whom it may concern:*

Be it known that I, HENRY GEISE, a citizen of the United States, and a resident of Philadelphia, State of Pennsylvania, have invented certain new and useful Improvements in Nut-Locks, of which the following is a full, clear, and exact description, reference being had to the accompanying drawings, forming part of this specification.

My invention relates to certain improvements in that class of devices employed for securing nuts on threaded bolts, and has for its object to provide an improved form of nut-lock which will effectively secure the nut in position upon the threads of the bolt.

In the accompanying drawings, Figure 1 is a sectional elevation illustrating the application of my improved form of nut-lock to a nut and threaded bolt. Fig. 2 is a transverse sectional elevation of the same on the line 2 2, Fig. 1; and Fig. 3 is a detached perspective view of the locking device and the nut to which it may be applied.

Referring to the drawings, $x$ $x'$ $x^2$ represent several pieces of metal or other material—as, for instance, the fish-plates and web of a railroad-rail which it is desired to secure together—and B is a threaded bolt of ordinary construction extending through suitable orifices therein.

On the threaded end of the bolt is screwed a nut C, said nut having in that face adjacent to the sections of the metal $x$ $x'$ $x^2$ a circular recess $c$ of such depth as will not materially weaken the nut. In this recess are placed two split rings D D', arranged one to overlap the other and each being wedge-shaped in cross-section, as shown more clearly in Fig. 1. The rim D, which is of small diameter, has a central opening $d$ and fits snugly around the threads of the bolt, while the larger ring D' fits over the tapered periphery of the ring D and has its periphery in close contact with the inner wall of circular recess $c$.

The arrangement of the rings with relation to the recess $c$ and the bolt is such that as the nut is gradually tightened the forward edge of the ring D' will make contact with the face of one of the sections of the material being screwed together, while the rear face of the rings D will make contact with the bottom wall of the recess $c$, the result being that as the nut is screwed up on its thread the two rings will be forced into more and more intimate contact with each other and, owing to the inclined plane upon which they meet, will gradually result in the increasing of the diameter of the outer ring D' and the decreasing of the inner diameter of the ring D. This results in the positive clamping of the smaller ring D on the threads of the bolt and the spreading and clamping of the larger ring D' outwardly against the inner wall of the recess $c$ in the nut C. By this means the various parts are forced so tightly together that the friction exerted between the meeting surfaces will be more than sufficient to hold the nut in position under ordinary conditions.

It will be understood that with a locking device of this character the rings, in lieu of being cut on a radial line, as shown, may be provided with lap-joints, or that only one of such rings may be of wedge shape in cross-section.

Having thus described my invention, what I claim, and desire to secure by Letters Patent, is—

1. The combination in a nut-lock of the recessed nut having internal screw-threads for the reception of the threads of a bolt, concentrically arranged overlapping rings adapted to said recess, said rings being wedge-shaped in cross-section and split to permit of the expansion and contraction, substantially as specified.

2. The combination in a nut-lock of the threaded bolt, a nut, C, having a recess, $c$, and threaded for the reception of the said bolt, overlapping washers or rings, D, D', adapted to fit within said recess, said washers or rings having inclined meeting surfaces and being split to permit of the expansion and contraction, substantially as specified.

In testimony whereof I have hereunto set my hand this 3d day of January, A. D. 1898.

HENRY GEISE.

Witnesses:
  MARY F. LYONS,
  HORACE PETTIT.